US008874800B2

(12) United States Patent
Kitayama et al.

(10) Patent No.: US 8,874,800 B2
(45) Date of Patent: Oct. 28, 2014

(54) PARAMETER MANAGEMENT APPARATUS FOR ACOUSTIC APPARATUS

(75) Inventors: Toru Kitayama, Hamamatsu (JP); Hiroto Fushimi, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 834 days.

(21) Appl. No.: 11/726,811

(22) Filed: Mar. 22, 2007

(65) Prior Publication Data

US 2007/0225985 A1 Sep. 27, 2007

(30) Foreign Application Priority Data

Mar. 23, 2006 (JP) ................................ 2006-080136
Aug. 4, 2006 (JP) ................................ 2006-213222

(51) Int. Cl.
*G06F 13/00* (2006.01)
*G06F 3/00* (2006.01)
*G06F 13/38* (2006.01)
*G10H 1/00* (2006.01)

(52) U.S. Cl.
CPC .................................. *G10H 1/0058* (2013.01)
USPC ........ 710/8; 710/16; 710/31; 710/62; 710/72; 710/104

(58) Field of Classification Search
None
See application file for complete search history.

(56) References Cited

U.S. PATENT DOCUMENTS 6,317,797 B2 * 11/2001 Clark et al. ........................ 710/5
6,505,214 B1 * 1/2003 Sherman et al. .............. 707/201
6,615,276 B1 * 9/2003 Mastrianni et al. ........... 709/250
6,636,897 B1 * 10/2003 Sherman et al. .............. 709/248
2005/0044196 A1 * 2/2005 Pullen et al. .................. 709/223
2007/0225985 A1 * 9/2007 Kitayama et al. ............. 704/275

* cited by examiner

*Primary Examiner* — Tanh Nguyen
(74) *Attorney, Agent, or Firm* — Morrison & Foerster LLP

(57) ABSTRACT

A parameter management apparatus manages a plurality of parameters provided for control of an externally connected acoustic apparatus. The parameter management apparatus has a storing portion for storing a plurality of parameters stored in the acoustic apparatus. The parameter management apparatus selects, from among the parameters stored in the storing portion and the acoustic apparatus, respectively, at least one parameter for which a match is caused between the storing portion and the acoustic apparatus. The parameter management apparatus then causes exact a match between the at least one parameter stored in the storing portion and the at least one parameter stored in the acoustic apparatus.

17 Claims, 5 Drawing Sheets

PARAMETER MANAGEMENT APPARATUS FOR ACOUSTIC APPARATUS

BACKGROUND OF THE INVENTION

1. Field of the Invention

The present invention relates to a parameter management apparatus for an externally connected acoustic apparatus, the parameter management apparatus managing a plurality of parameters provided for control of the acoustic apparatus. The present invention also relates to a computer program applied to the parameter management apparatus.

2. Description of the Related Art

In a conventional scheme, an electronic musical instrument is externally connected to a personal computer (hereinafter referred to as "PC"), while a software program for controlling the electronic musical instrument is executed by the PC to enable remote-control of the electronic musical instrument. In order to edit parameters provided for the electronic musical instrument on the PC, in this case, a user starts, on the PC, an editor which enables editing of the parameters of the electronic musical instrument, and manipulates operators to edit the parameters. The PC has a storing portion which includes at least a current buffer and a voice buffer. The current buffer stores current parameters which are the parameters being currently set. The plurality of current parameters stored in the current buffer are bunched together to be stored in the voice buffer as a file having a voice name. The current parameters are user-editable by use of operators. Parameters stored in the current buffer are the current parameters edited in accordance with user's manipulation of the operators. The thus edited current parameters are allowed to be stored in the voice buffer as a file containing a group of user's favorite current parameters with a voice name added. As a result, the user is allowed to create his favorite library composed of a plurality of voice files stored in the voice buffer.

Furthermore, the user is also allowed to edit current parameters on the electronic musical instrument by manipulating operators thereof. The electronic musical instrument is also provided with a storing portion including a current buffer for storing current parameters and a voice buffer for storing, as files each having a voice name, groups of current parameters stored in the current buffer. When the electronic musical instrument is connected to the PC, there are cases where respective contents of the current buffer and the voice buffer of the electronic musical instrument do not match with those of the PC. In order to prevent such mismatch of the contents of those buffers, when the electronic musical instrument is connected to the PC, a scheme for causing matches between the respective buffers of the PC and those of the electronic musical instrument is adopted. The scheme results in exact matches between the contents of the buffers of the PC and those of the electronic musical instrument, avoiding inconvenience such mismatch may cause.

SUMMARY OF THE INVENTION

In the above-described conventional apparatus, when matches are sought between respective parameter values of the PC and those of the electronic musical instrument, the direction in which the matches are sought is selectable. In other words, the contents of the current buffer and the voice buffer of the PC are transferred to the electronic musical instrument to match the contents of the current buffer and the voice buffer of the electronic musical instrument to those of the current buffer and the voice buffer of the PC. Conversely, the contents of the current buffer and the voice buffer of the electronic musical instrument can be transferred to the PC to match the contents of the current buffer and the voice buffer of the PC to those of the current buffer and the voice buffer of the electronic musical instrument. In the conventional apparatus, however, the contents of both the current buffer and the voice buffer are transferred altogether in a selected direction to obtain matches between the contents of the PC and those of the electronic musical instrument. In the conventional apparatus, therefore, there is a problem that the conventional apparatus is unable to transfer the respective contents of the current buffer and the voice buffer in a different direction, respectively, to cause both the PC and the electronic musical instrument to have the same contents of the current buffer and the voice buffer. Furthermore, there is another problem that the conventional apparatus transfers all the contents of the current buffer and the voice buffer altogether to obtain matches between the contents of the buffer of the PC and those of the electronic musical instrument, being unable not only to select some of the contents of the current buffer or voice buffer to obtain matches between the selected contents of the PC and those of the electronic musical instrument but also to specify a direction in which the selected contents are transferred.

The present invention was accomplished to solve the above-described problems, and an object thereof is to provide a parameter management apparatus for an externally connected acoustic apparatus and a computer program for the parameter management apparatus, the parameter management apparatus enables exact matches between only some of a plurality of parameters stored in the acoustic apparatus and some of a plurality of parameters stored in the parameter management apparatus.

In order to achieve the above-described object, a configurational feature of the present invention is to provide a parameter management apparatus for an externally connected acoustic apparatus, the parameter management apparatus managing a plurality of parameters for controlling the acoustic apparatus, the parameter management apparatus comprising a storing portion for storing a plurality of parameters stored in the acoustic apparatus; a first selecting portion for selecting, from among the plurality of parameters stored in the storing portion and the acoustic apparatus, respectively, at least one parameter for which a match is to be caused between the storing portion and the acoustic apparatus; and a match controlling portion for causing a match between the at least one parameter stored in the storing portion and selected by the first selecting portion and the at least one parameter stored in the acoustic apparatus and selected by the first selecting portion. This feature enables exact matches of only some of the plurality of parameters stored in the acoustic apparatus and the parameter management apparatus, respectively, between the acoustic apparatus and the parameter management apparatus. As a result, the present invention increases flexibility in managing the parameters of the acoustic apparatus. For instance, the present invention enables a user to promptly and easily achieve complicated parameter settings, such as adopting some parameters stored in the acoustic apparatus while adopting the other parameters stored in the parameter management apparatus.

The other feature of the present invention is to provide a parameter management apparatus for an acoustic apparatus, the parameter management apparatus further comprising a second selecting portion for selecting either of a first matching direction in which the at least one parameter stored in the acoustic apparatus and selected by the first selecting portion follow the at least one parameter stored in the storing portion and selected by the first selecting portion to cause a match between the at least one parameter stored in the storing portion and the at least one parameter stored in the acoustic apparatus or a second matching direction in which the at least one parameter stored in the storing portion and selected by the first selecting portion follow the at least one parameter stored in the acoustic apparatus and selected by the first selecting portion to cause a match between the at least one parameter stored in the storing portion and the at least one parameter stored in the acoustic apparatus, wherein when the first matching direction is selected by the second selecting portion, the match controlling portion matches the at least one parameter stored in the acoustic apparatus to the at least one parameter stored in the storing portion, and when the second matching direction is selected by the second selecting portion, the matching controlling portion matches the at least one parameter stored in the storing portion to the at least one parameter stored in the acoustic apparatus. The other feature enables some of the parameters of the parameter management apparatus to follow some of the parameters of the acoustic apparatus, or some of the parameters of the acoustic apparatus to follow some of the parameters of the parameter management apparatus, further increasing flexibility in managing the parameters of the acoustic apparatus.

In addition to the parameter management apparatus, the present invention can be also embodied as invention of a computer program and method applied to the parameter management apparatus.

DESCRIPTION OF THE PREFERRED EMBODIMENT

Figure 1:
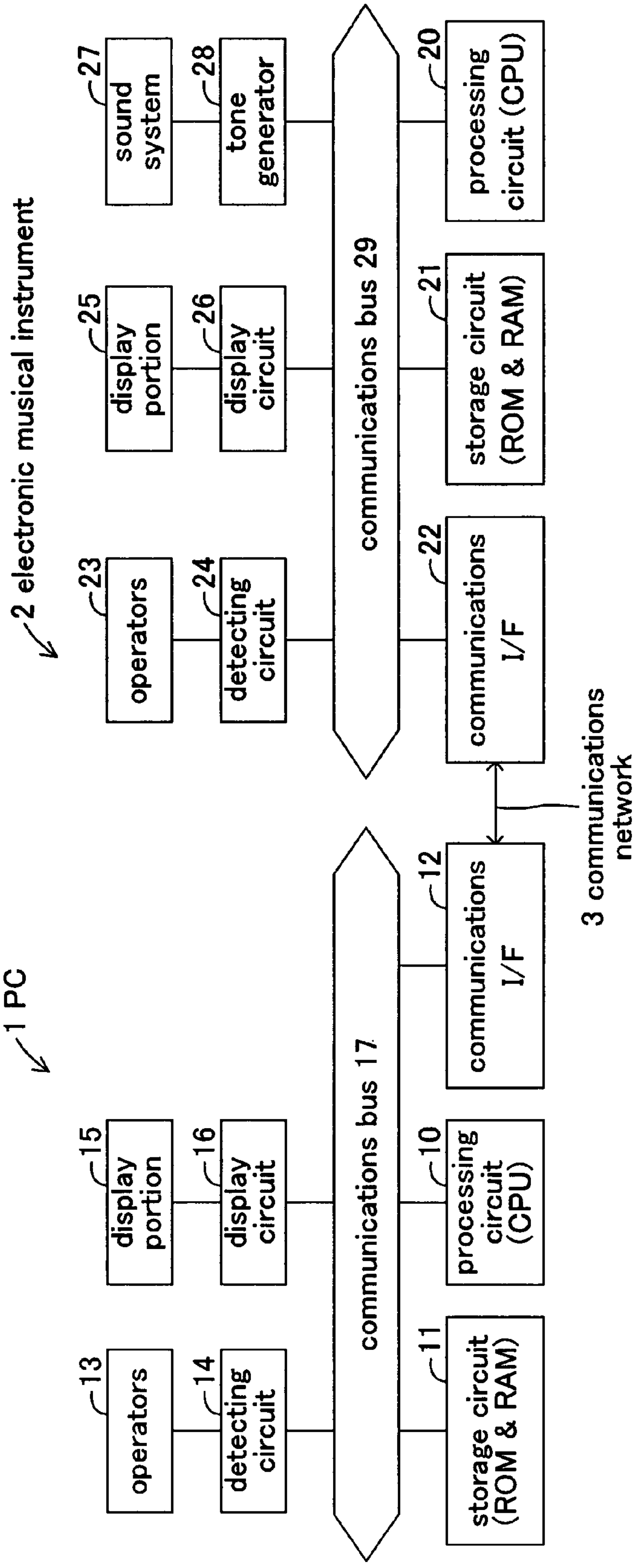
FIG. 1 is a block diagram showing a personal computer used as a parameter management apparatus according to the present invention and an electronic musical instrument used as an acoustic apparatus connected to the personal computer.

An embodiment of the present invention will now be described with reference to the drawings. FIG. 1 is a block diagram showing the configuration of a personal computer (hereinafter referred to as "PC") 1 used as a parameter management apparatus and an electronic musical instrument 2 used as an acoustic apparatus. On the PC 1, a parameter management program for managing parameters of the electronic musical instrument 2 is installed.

The PC 1 has a CPU (Central Processing Unit) 10, which controls the entire operation of the PC 1 and executes operational software such as the parameter management program. A storage circuit 11 includes a ROM (Read Only Memory) and a RAM (Random Access Memory). The ROM stores operational software such as the parameter management program executed by the CPU 10. The RAM has a working area for the CPU 10 and a buffer storage area for storing later-described various parameters to be set on the electronic musical instrument 2. The ROM of the storage circuit 11 can be a rewritable ROM such as a Flash memory to enable the rewriting of the operational software, facilitating update of the operational software.

A communications interface (I/F) 12 is an interface for connecting the PC 1 to a communications network 3 such as a wired or wireless LAN (Local Area Network), the Internet or a telephone line. Via the communications network 3, the electronic musical instrument 2 can be connected to the PC 1. The communications interface (I/F) 12 may be an interface such as a USB (Universal Serial Bus) and IEEE 1394 to allow direct connection between the PC 1 and the electronic musical instrument 2. A detecting circuit 14 scans operators 13 such as a keyboard and a pointing device to detect operational events of the operators 13, and then outputs event outputs corresponding to the operators 13 which produced the operational events. A display circuit 16 causes a display portion 15 such as a liquid crystal display to display various screens corresponding to a running application program. When the parameter management program is started on the PC 1, for instance, the display circuit 16 causes the display portion 15 to display a screen for setting parameters of the electronic musical instrument 2. On the setting screen, a user is allowed to specify respective identifiers (i.e., name, symbol, number, etc.) indicative of the type of the parameters and respective values of the parameters through the use of a GUI (Graphical User Interface). The above-described elements are connected to a communications bus 17.

On the electronic musical instrument 2, a CPU (Central Processing Unit) 20 controls the entire operation of the electronic musical instrument 2 and executes operational software such as a tone generation control program. A storage circuit 21 includes a ROM (Read Only Memory) and a RAM (Random Access Memory). The ROM stores at least operational software such as the tone generation control program executed by the CPU 20. The RAM has a working area for the CPU 20 and buffer storage area for storing a plurality of parameters provided for control of a tone generator 28. The ROM of the storage circuit 21 can be a rewritable ROM such as a Flash memory to enable the rewriting of the operational software, facilitating update of the operational software. A communications interface (I/F) 22 is an interface for connecting the electronic musical instrument 2 to the above-described communications network 3. In the case of the electronic musical instrument 2 as well, the communications interface (I/F) 22 may be an interface such as a USB (Universal Serial Bus) and IEEE 1394 to allow direct connection between the PC 1 and the electronic musical instrument 2.

A detecting circuit 24 scans operators 23 such as a keyboard, panel operators and a pointing device to detect operational events of the operators 23, and then outputs event outputs corresponding to the operators 23 which produced the operational events. Through the use of the operators 23, the user is allowed to specify or edit parameter values such as loudness and tone color for controlling the tone generator 28. A display circuit 26 causes a display portion 25 such as a liquid crystal display to display various screens such as a screen for managing parameters such as loudness and tone color for controlling the tone generator 28. On a setting screen, the user is allowed to make various settings and to instruct the start and finish of the reproduction of performance data through the use of a GUI (Graphical User Interface). The tone generator 28, which is composed of a waveform memory tone generator having a waveform memory, an FM tone generator, and the like, generates musical tone waveform data on the basis of the set parameters under the control of the processing circuit 20. The musical tone waveform data generated by the tone generator 28 is supplied to a sound system 27. The sound system 27 converts the supplied musical tone waveform data to analog signals and then emits the converted signals as musical tones. The sound system 27 is allowed to control loudness and quality. The above-described elements are connected to a communications bus 29.

As described above, the electronic musical instrument 2 is connected to the PC 1 via the communications network 3. If an application program of a sequencer of the PC 1 is started, therefore, performance data can be supplied from the PC 1 to the electronic musical instrument 2 to allow the reproduction of the performance data on the electronic musical instrument 2. If the parameter management program is started on the PC 1, furthermore, the user is allowed to specify or edit the parameters of loudness, tone color and the like, the parameters for controlling the tone generator 28 of the electronic musical instrument 2. For cases where the parameters stored in the storage circuit 11 of the PC 1 do not match with those stored in the storage circuit 21 of the electronic musical instrument 2, in addition, a matching capability to provide exact matches between the parameters of the PC 1 and those of the electronic musical instrument 2 is given at least to the PC 1. The matching capability may be given to both of the PC 1 and the electronic musical instrument 2.

The storage circuit 11 of the PC 1 has at least a current buffer and a voice buffer. The storage circuit 21 of the electronic musical instrument 2 similarly has at least a current buffer and a voice buffer. In these current buffers, current parameters which are the parameters being currently in use for the control of the electronic musical instrument 2 are stored. Each of the current parameters is composed of an identifier (name, symbol, number, etc.) indicative of the type of the parameter and a set value. The set values of the current parameters are read from the current buffer and then set on the tone generator 28 of the electronic musical instrument 2. These current parameters include a plurality of parameters for a voice capability of specifying a tone color. The set values of the current parameters can be specified by the user through the manipulation of the operators. The user is also allowed to store voice files each having a voice name in the voice buffer. Each voice file is composed of a plurality of parameters necessary for the voice capability of generating musical tones having a user's favorite tone color. The voice files stored in the voice buffer compose a user-defined library.

Figure 2:
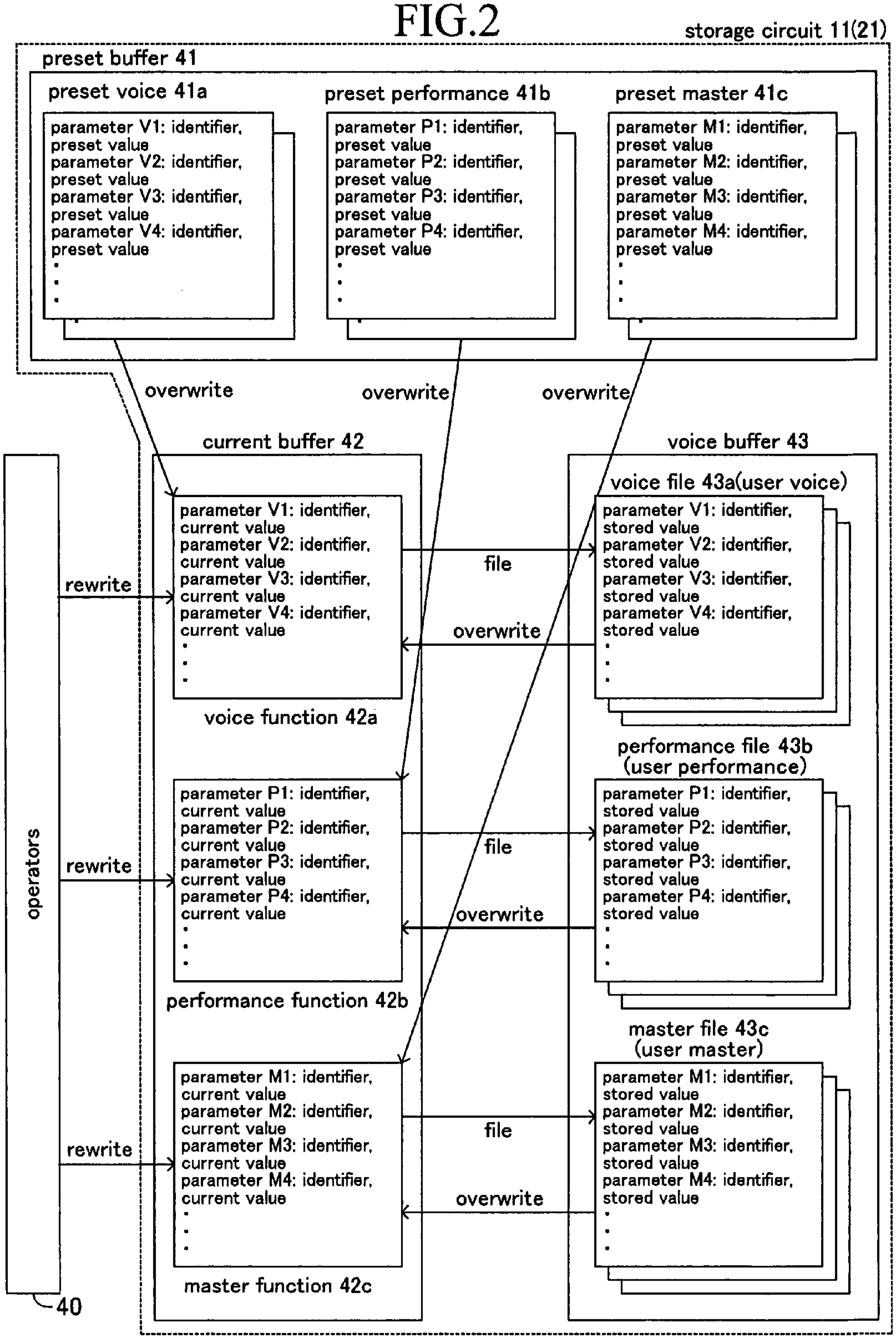
FIG. 2 is a diagram showing buffers included in respective storage circuits of the personal computer and the electronic musical instrument shown in FIG. 1.

As described above, the storage circuit 11 of the PC 1 and the storage circuit 21 of the electronic musical instrument 2 each having the same configuration store various parameters which are to be set on the electronic musical instrument 2. An example configuration of the storage circuit 11 (21) is shown in FIG. 2. As shown in FIG. 2, the storage circuit 11 (21) has a current buffer 42 and a voice buffer 43 as well as a preset buffer 41. The preset buffer 41 stores a plurality of preset parameters each of which is composed of an identifier and a previously set value. The preset parameters are classified into a preset voice 41 a, a preset performance 41*b* and a preset master 41*c* according to function.

The terms of "voice", "performance" and "master" which are used in the specifications will now be explained. The term of "voice" relates to a musical tone generation mode in which a musical tone signal is generated as a performance tone (hereinafter referred to as voice mode). Terms having "voice" indicate elements used in the voice mode. Therefore, parameters on "voice" are the parameters for specifying a tone color of a musical tone signal which is to be emitted as a performance tone. The term of "performance" relates to a musical tone generation mode in which a plurality of musical tone signals (e.g., four at the maximum) are synthesized to generate a performance tone (hereinafter referred to as performance mode). Terms having "performance" indicate elements used in the performance mode. Therefore, parameters on "performance" are the parameters for specifying respective tone colors of musical tone signals which are to be emitted as a performance tone. In this case, the parameters on "performance" may be the parameters corresponding to "voices" each of which specifies a tone color of a musical tone signal. Alternatively, the parameters on "performance" may be the parameters for specifying the "voices". The term of "master" relates to musical tone elements (master volume, equalizer, effect, etc.) to be added to all the musical tone signals which are to be output. Terms having "master" indicate elements relating to the musical tone elements. Therefore, parameters on "master" are the parameters necessary for the control of the musical tone elements.

For example, the preset voice 41*a* includes a plurality of parameter packs formed by grouping a plurality of parameters V1, V2, V3, V4 . . . (respective identifiers and respective preset values) according to the type of the voices. The preset performance 41*b* includes a plurality of parameter packs formed by grouping a plurality of parameters P1, P2, P3, P4 . . . (respective identifiers and respective preset values) according to the type of performances. The preset master 41*c* includes a plurality of parameter packs formed by grouping a plurality of parameters M1, M2, M3, M4 . . . (respective identifiers and respective preset values) according to the type of masters.

The current buffer 42 stores a plurality of current parameters which are currently in use. These current parameters are also classified into a voice function 42*a*, a performance function 42*b* and a master function 42*c* according to function. For instance, the voice function 42*a* is a parameter pack composed of a plurality of parameters V1, V2, V3, V4 . . . (respective identifiers and respective current values) for voice. The performance function 42*b* is a parameter pack composed of a plurality of parameters P1, P2, P3, P4 . . . (respective identifiers and respective current values) for performance. The master function 42*c* is a parameter pack composed of a plurality of parameters M1, M2, M3, M4 . . . (respective identifiers and respective current values) for master. The respective parameter packs stored in the current buffer 42 can be overwritten with any one of the parameter packs of the same type stored in the preset buffer 41. In other words, any one of the parameter packs of the preset voice 41 a can replace the parameter pack of the voice function 42*a*. At the time of the replacement, more specifically, the current values of the parameters of the voice function 42*a* are overwritten with the preset values of the parameters of the preset voice 41*a*.

In addition, any one of the parameter packs of the preset performance 41*b* can replace the parameter pack of the performance function 42*b*. At the time of the replacement, more specifically, the current values of the parameters of the performance function 42*b* are overwritten with the preset values of the parameters of the preset performance 41*b*. Furthermore, any one of the parameter packs of the preset master 41*c* can replace the parameter pack of the master function 42*c*. At the time of the replacement, more specifically, the current values of the parameters of the master function 42*c* are overwritten with the preset values of the parameters of the preset master 41*c*. Moreover, the current parameters stored in the current buffer 42 can be stored in the voice buffer 43 as files. In the present embodiment, in this case, current parameters are organized as a file on a parameter pack basis to be stored in the voice buffer 43, the parameter pack being classified according to function. Alternatively, all the current parameters stored in the current buffer 42 may be organized as a file to be stored in the voice buffer 43. In addition, the respective set values of the parameters of the voice function 42*a*, the performance function 42*b* and the master function 42*c* can be rewritten to desired values by the user's manipulation of operators 40 to obtain his desired tone color and the like.

The voice buffer 43 stores voice parameters organized as files. These files are classified into voice files (user voice) 43*a*, performance files (user performance) 43*b* and master files (user master) 43*c* according to function. For instance, each of the voice files 43*a* is composed of a plurality of parameters V1, V2, V3, V4 . . . (respective identifiers and respective stored values) for voice. Each of the performance files 43*b* is composed of a plurality of parameters P1, P2, P3, P4 . . . (respective identifiers and stored values) for performance. Each of the master files 43*c* is composed of a plurality of parameters M1, M2, M3, M4 . . . (respective identifiers and respective stored values) for master.

Each of the voice files 43*a* is a file formed by organizing the parameter pack of the voice function 42*a* to be stored as a file in the voice buffer 43. Each of the performance files 43*b* is a file formed by organizing the parameter pack of the performance function 42*b* to be stored as a file in the voice buffer 43. Each of the master files 43*c* is a file formed by organizing the parameter pack of the master function 42*c* to be stored as a file in the voice buffer 43. Since the user is allowed to rewrite and edit the set values of the current parameters by manipulating the operators 40, as described above, the user is allowed to organize the parameter pack of the current buffer 42 as a file and to store the file in the voice buffer 43 at each editing of the set values of the current parameters. As described in FIG. 2, as a result, the voice files 43*a*, the performance files 43*b*, and the master files 43*c* stored in the voice buffer 43 are a plurality of files each having different set values. As described above, each of the parameter packs classified according to function can be stored in the voice buffer 43 as corresponding individual files. Alternatively, all the current parameters of all the parameter packs may be stored as a file in the voice buffer 43 without being classified according to function.

The operators 40 shown in FIG. 2 are equivalent to the operators 23 of the electronic musical instrument 2. The operators 23 of the electronic musical instrument 2 are manipulated by the user to control respective set values of the current parameters. If the user selects certain current parameters and manipulates the operators 23, the set values of the selected current parameters are changed in accordance with the amount of the user' manipulation. The edited values of the current parameters are stored in the current buffer 42 of the storage circuit 21 of the electronic musical instrument 2. By user's manipulation of the operators 23, in addition, the set values of the current parameters can be stored as a new file in the voice buffer 43 of the storage circuit 21, or a desired file can be read out from the voice buffer 43 of the storage circuit 21 to replace the values of the current parameters of the current buffer 42 of the storage circuit 21 with set parameter values of the desired file. The settings of the current parameters affect the tone generator 28. The tone generator 28 then synthesizes musical tone signals in accordance with the set values of the current parameters. The synthesized musical tone signals are then emitted as tones from the sound system 27.

The operators 40 shown in FIG. 2 are also equivalent to the operators 13 of the PC 1. If the parameter management program is started on the PC 1, the user is allowed to control set values of the current parameters by manipulating the operators 13 of the PC 1. If the user selects certain current parameters and manipulates the operators 13, the set values of the selected current parameters are changed in accordance with the amount of the user' manipulation. The edited values of the current parameters are stored in the current buffer 42 of the storage circuit 11 of the PC 1. By user's manipulation of the operators 13, in addition, the set values of the current parameters can be stored as a new file in the voice buffer 43 of the storage circuit 11, or a desired file can be read out from the voice buffer 43 of the storage circuit 11 to replace the values of the current parameters of the current buffer 42 of the storage circuit 11 with parameter values of the desired file.

As described above, the PC 1 and the electronic musical instrument 2 are allowed to have the same current parameter values stored in the current buffer 42 and the same files stored in the voice buffer 43. In a state where the current parameter values match between the PC 1 and the electronic musical instrument 2, however, if the user manipulates the operators 13 (23) of the PC 1 (or electronic musical instrument 2) to select some of the current parameters to change the set values of the selected current parameters, the user's manipulation of the operators 13 (23) results in mismatch between the selected current parameter values of the PC 1 and those of the electronic musical instrument 2. In a case where the set values of the current parameters have been changed by manipulating the operators 13 (23) of the PC 1 (or electronic musical instrument 2), therefore, automatic matching of the current parameter values between the PC 1 and the electronic musical instrument 2 is performed. For instance, when the user manipulates the operators 13 of the PC 1 to change the set values of the current parameters stored in the storage circuit 11 of the PC 1, the current parameters including the changed set values of the PC 1 are transferred to the electronic musical instrument 2 to replace the set values of the corresponding current parameters of the current buffer 42 of the storage circuit 21 of the electronic musical instrument 2 with the current parameters received from the PC 1. As a result, the automatic matching brings about exact matches between the current parameters of the PC 1 and those of the electronic musical instrument 2. In a case where the set values of the current parameters are changed by manipulating the operators 23 of the electronic musical instrument 2, the current parameters including the changed set values of the electronic musical instrument 2 are transferred to the PC 1 to replace the set values of the corresponding current parameters of the current buffer 42 of the storage circuit 11 with the current parameters received from the electronic musical instrument 2. As a result, the automatic matching brings about exact matches between the current parameters of the PC 1 and those of the electronic musical instrument 2.

In a case where the operators 13 of the PC 1 are operated to make a file containing the current parameter values to store the file in the voice buffer 43 of the storage circuit 11, furthermore, the file which is newly stored in the voice buffer 43 of the PC 1 is transferred to the electronic musical instrument 2. The electronic musical instrument 2 then stores the received file in the voice buffer 43 of the storage circuit 21 to cause exact matches between the current parameters of the files stored in the PC 1 and the electronic musical instrument 2. In a case where the operators 23 of the electronic musical instrument 2 are operated to make a file containing the current parameter values to store the file in the voice buffer 43 of the storage circuit 21, the file newly stored in the voice buffer 43 of the electronic musical instrument 2 is transferred to the PC 1. The PC 1 then stores the received file in the voice buffer 43 of the storage circuit 11 to cause exact matches between the current parameters of the files stored in the PC 1 and the electronic musical instrument 2.

Figure 3:
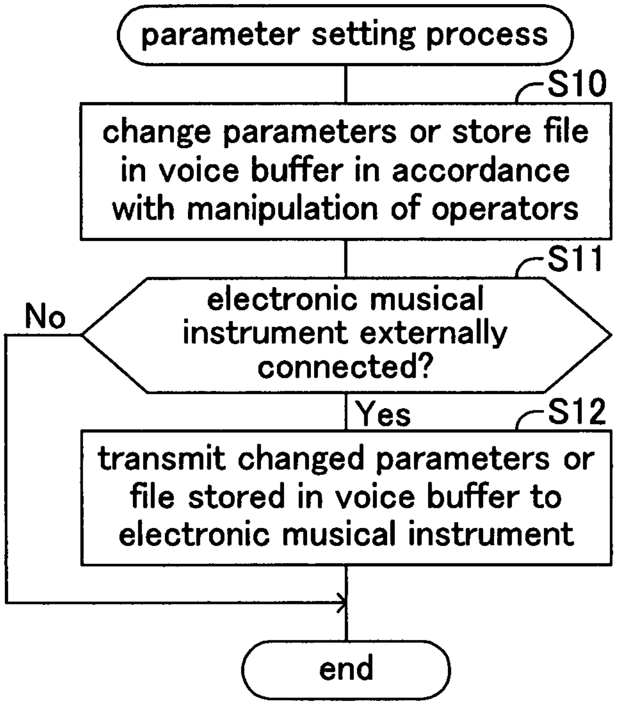
FIG. 3 is a flowchart showing a parameter setting process program executed by the personal computer shown in FIG. 1.

FIG. 3 shows a flowchart of a parameter setting process program included in the parameter management program executed by the PC 1 (the parameter management apparatus of the present invention). When the operators 13 of the PC 1 are operated to instruct to change the set values of the current parameters or to instruct to make a file of the current parameters to store the file in the voice buffer 43, the parameter setting process program which enables making of parameter settings by the operators is started. In the parameter setting process program, if the set values of the current parameters are changed in accordance with the manipulation of the operators 13, the changed set values are stored in the current buffer 42 of the storage circuit 11 at step S10. Alternatively, the current parameters stored in the current buffer 42 are stored as a file in the voice buffer 43 in accordance with the manipulation of the operators 13.

It is then determined at step S11 whether the electronic musical instrument 2 (external apparatus) is connected to the PC 1. If it is determined that the electronic musical instrument 2 is not connected to the PC 1, the parameter setting process program is immediately terminated. If it is determined that the electronic musical instrument 2 is connected to the PC, the process proceeds to step S12. At step S12, if the set values of the current parameters have been changed, at least the changed current parameters of the current parameters stored in the current buffer 42 are transmitted to the electronic musical instrument 2. If a file has been stored in the voice buffer 43, the file stored in the voice buffer 43 is transmitted to the electronic musical instrument 2 at step S12. After the step S12, the parameter setting process program is terminated.

A similar parameter setting process program is executed on the electronic musical instrument 2 as well. The parameter setting process program executed on the electronic musical instrument 2 is similarly started when the operators 23 of the electronic musical instrument 2 are operated to instruct to change the set values of the current parameters or to instruct to make a file of the current parameters and to store the file in the voice buffer 43. The changed set values of the current parameters or the file stored in the voice buffer 43 are transmitted from the electronic musical instrument 2 to the PC 1. In the parameter setting process program executed on the electronic musical instrument 2, however, the external apparatus indicates the PC 1.

Figure 4:
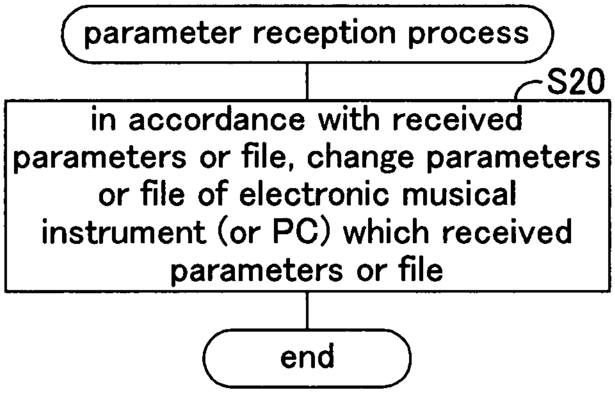
FIG. 4 is a flowchart showing a parameter reception process program executed by the personal computer and the electronic musical instrument shown in FIG. 1.

FIG. 4 shows a flowchart of a parameter reception process program included in the parameter management program, the parameter reception process program being started when the set values of the current parameters changed or the file stored in the voice buffer 43 on the PC 1 (or the electronic musical instrument 2) are received. At step S20 which follows the start of the parameter reception process program, if the electronic musical instrument 2 (or the PC 1) has received the current parameters, the reception of the current parameters causes replacement of the set values of the corresponding current parameters stored in the current buffer 42 of the storage circuit 21 of the electronic musical instrument 2 (or in the current buffer 42 of the storage circuit 11 of the PC 1) which has received the current parameters with the set values of the received current parameters. If the electronic musical instrument 2 (or the PC 1) has received the file, the received file is stored in the voice buffer 43 of the storage circuit 21 of the electronic musical instrument 2 (or in the voice buffer 43 of the storage circuit 11 of the PC 1) which received the file. After S20, the parameter reception process program is terminated.

Figure 5:
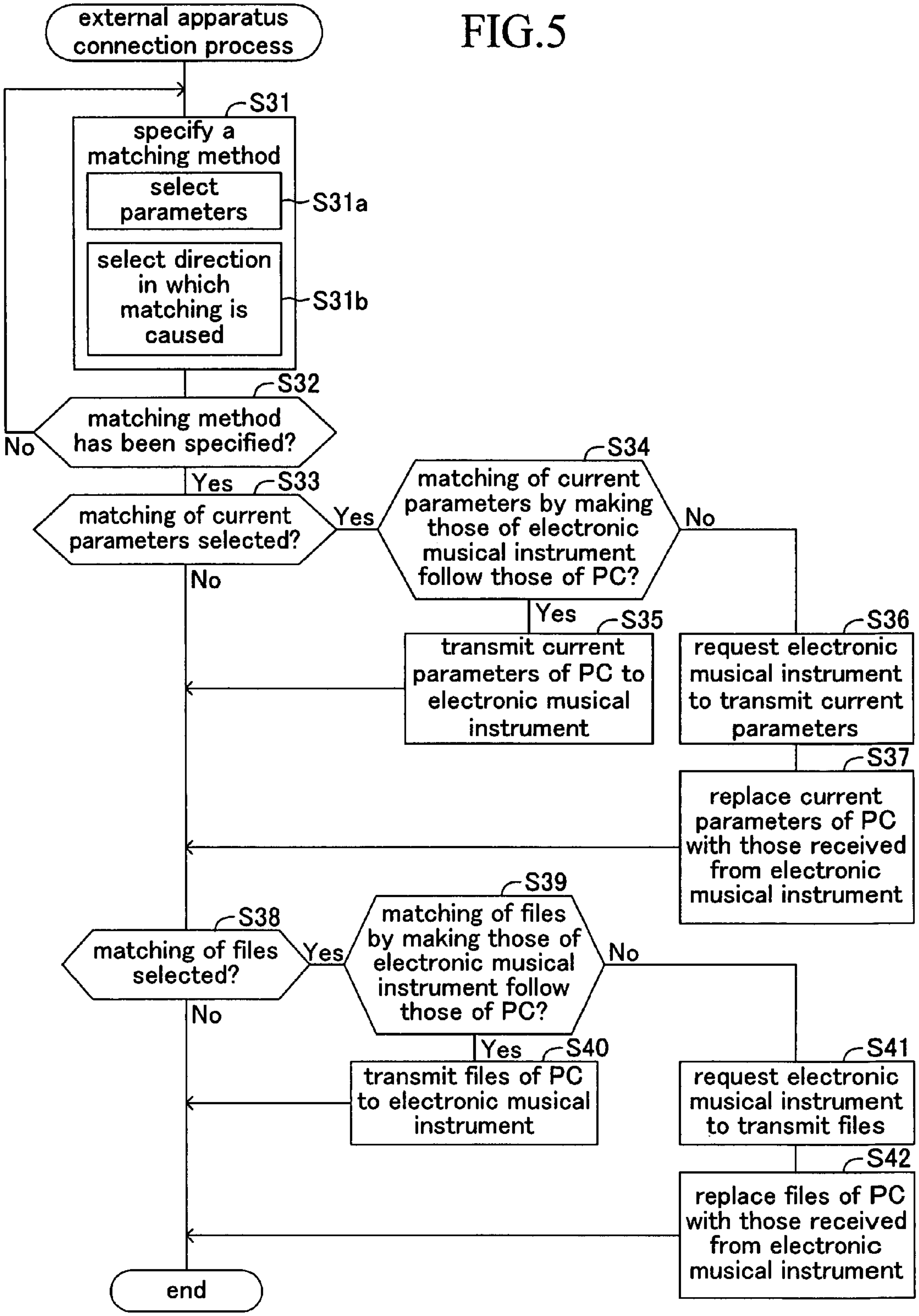
FIG. 5 is a flowchart showing an external apparatus connection process program executed by the personal computer shown in FIG. 1.

FIG. 5 shows a flowchart of an external apparatus connection process program included in the parameter management program executed on the parameter management apparatus (PC 1) of the present invention. Basically, the external apparatus connection process program is executed when an external apparatus (in this embodiment, the electronic musical instrument 2) is newly connected to the PC 1. When the electronic musical instrument 2 (external apparatus) is connected to the PC 1 and the parameter management program is started or the electronic musical instrument 2 (external apparatus) is connected to the PC 1 and make the parameter management program executed on the PC 1 recognize the connection of the electronic musical instrument 2 to the PC 1, more specifically, the external apparatus connection process program is started.

If the external apparatus connection process program is started, the PC 1 causes at step S31 the display unit 15 to present a setting screen in which a matching method is specified. On the setting screen, the user specifies a method of causing matches of parameters. At S32, it is determined whether the user has specified a matching method. The process for specifying a matching method performed at step S31 includes step S31*a* at which the user selects parameters for which matches are caused and step S31*b* at which the user selects the direction in which the matches are caused. These processes of steps S31*a*, S31*b* are performed in conjunction with each other. At step S31*a* of the selection of parameters for which matches are caused, the user is able to select either concurrently designating all the parameters included in the current buffer 42 and the voice buffer 43 (all the parameter packs relating to the voice function 42*a*, the performance function 42*b* and the master function 42*c* of the current buffer 42, and all the files included in the voice buffer 43) or individually designating parameters included in the current buffer 42 and parameters (i.e., files) included in the voice buffer 43.

In the individual designation of parameters included in the current buffer 42, the user is able to select one of the following methods. In the first method, all the current parameters (i.e., all the current parameters or all the parameter packs stored in the current buffer 42) are designated at a time. In the second method, one current parameter or plural current parameters are designated from among all the current parameters. In the third method, one parameter pack or plural parameter packs are designated from among all the parameter packs stored in the current buffer 42 on a parameter pack basis for the voice function 42*a*, the performance function 42*b* and the master function 42*c*.

In the individual designation of files included in the voice buffer 43, the user adopts one of the following methods. In the first method, all the files (i.e., all the files stored in the voice buffer 43) are designated at a time. In the second method, all the voice files 43*a*, all the performance files 43*b* or all the master files 43*c* are designated in a cluster of files. In the third method, one file or plural files are individually selected from among all the files stored in the voice buffer 43 (the voice files 43*a*, the performance files 43*b* and the master files 43*c*).

At step S31*b* of the selection of a direction in which matches are caused, at each designation of parameters or files, the user selects either matching the parameters of the electronic musical instrument 2 to those of the PC 1 or matching the parameters of the PC 1 to those of the electronic musical instrument 2. In other words, the user can individually specify the direction in which a match of each parameter or file is sought. In addition, the user is allowed to specify the direction of matches between parameters as a unit of some of all the current parameters, as a unit of a parameter pack, as a unit of the voice files 43*a*, the performance files 43*b* or the master files 43*c*, or as a unit of a file included in the voice files 43*a*, the performance files 43*b* and the master files 43*c*.

If a positive determination is made at step S32, in other words, if the selections for the matching method have been made, it is determined at step S33 whether the user has selected to cause matches between the current parameters stored in the current buffer 42. If matching between the current parameters stored in the current buffer 42 has been selected, a positive determination is made at step S33. It is then determined at step S34 whether the user has selected to cause the current parameters of the electronic musical instrument 2 to follow those of the PC 1 to obtain matches of the current parameters between the PC 1 and the electronic musical instrument. If the user has selected to match the current parameters of the electronic musical instrument 2 to those of the PC 1, a positive determination is made at step S34 to proceed to step S35. At step S35, the current parameters, which are stored in the current buffer 42 of the PC 1 and for which matches are to be sought, are transmitted to the electronic musical instrument 2 (externally connected apparatus). These steps enables the electronic musical instrument 2 to receive the current parameters for which matches are caused to start the above-described parameter reception process program. On the basis of the received current parameters, the current parameters which are stored in the current buffer 42 of the electronic musical instrument 2 and have been selected by the user to cause matches are replaced with the received current parameters.

Figure 6:
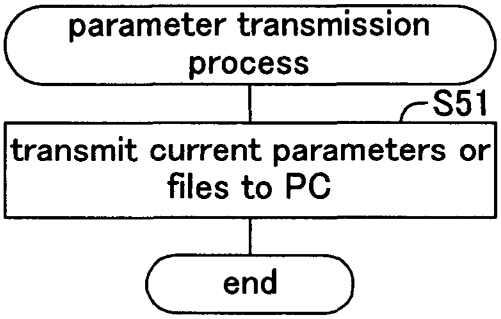
FIG. 6 is a flowchart showing a parameter transmission process program executed by the electronic musical instrument shown in FIG. 1.

If the user has selected to match the current parameters of the PC 1 to those of the electronic musical instrument 2, on the other hand, a negative determination is made at step S34 to proceed to step S36. At step S36, PC 1 requests the electronic musical instrument 2 (the externally connected apparatus) to transmit the current parameters which are stored in the current buffer 42 of the electronic musical instrument 2 and for which matches are sought. In response to this-request, the electronic musical instrument 2 starts a parameter transmission process program shown in FIG. 6 to transmit to the PC 1, at step S51, the current parameters which are stored in the current buffer 42 of the electronic musical instrument 2 and for which matches are sought. The PC 1 then receives the current parameters transmitted from the electronic musical instrument 2 at step S37 and causes the received current parameters to replace the current parameters which are stored in the current buffer 42 of the PC 1 and for which matches are sought.

As a result, the user is allowed to selectively match the current parameters of the electronic musical instrument 2 to those of the PC 1. Conversely, the user is also allowed to selectively match the current parameters of the PC 1 to those of the electronic musical instrument 2. More specifically, the user is allowed to cause matches of all the current parameters stored in the current buffer 42, some of all the current parameters, or current parameters included in respective parameter packs of the voice function 42*a*, performance function 42*b* or master function 42*c* of the current buffer 42 between the PC 1 and the electronic musical instrument 2.

If a negative determination is made at step S33, that is, if it is determined that matching of current parameters has not been selected, or if the process of step S35 or S37 has been completed, it is determined at step S38 whether matching of files stored in the voice buffer 43 has been selected or not. If matching of files stored in the voice buffer 43 has been selected, a positive determination is made at step S38 to proceed to step S39. At step S39, it is determined whether it has been selected to make the files of the electronic musical instrument 2 follow those of the PC 1 to cause matches between the files of the PC 1 and those of the electronic musical instrument 2. If it has been selected to make the files of the electronic musical instrument 2 follow those of the PC 1 has been selected, a positive determination is made at step S39 to proceed to step S40. At step 40, the files, which are stored in the voice buffer 43 of the PC 1 and for which matches are sought, are transmitted to the electronic musical instrument 2 (the externally connected apparatus). These steps enable the electronic musical instrument 2 to receive the files for which matches are caused. The electronic musical instrument 2 then starts the above-descried parameter reception process program to replace the files which are stored in the voice buffer 43 of the electronic musical instrument 2 and for which matches are sought with the received files. If the voice buffer 43 of the electronic musical instrument 2 does not store the files for which matches are to be sought, the received files are copied to the voice buffer 43 of the electronic musical instrument 2.

If the user has selected to make the files of the PC 1 follow those of the electronic musical instrument 2 to cause matches between the files of the PC 1 and those of the electronic musical instrument 2, a negative determination is made at step S39 to proceed to step S41. At step S41, PC 1 requests the electronic musical instrument 2 (the externally connected apparatus) to transmit the files which are stored in the voice buffer 43 and for which matches are sought. In response to this request, the electronic musical instrument 2 starts the parameter transmission process program shown in FIG. 6 to transmit to the PC 1, at step S51, the files which are stored in the voice buffer 43 of the electronic musical instrument 2 and for which matches are sought. The PC 1 then receives, at step S42, the files transmitted from the electronic musical instrument 2 to replace the files which are stored in the voice buffer 43 of the PC 1 and for which matches are sought with the received files. If the voice buffer 43 of the PC 1 does not store the files for which matches are to be sought, the received files are copied to the voice buffer 43 of the PC 1.

As a result, the user is allowed to selectively match the files of the electronic musical instrument 2 to those of the PC 1. Conversely, the user is also allowed to selectively match the files of the PC 1 to those of the electronic musical instrument 2. More specifically, the user is allowed to cause matches of all the files stored in the voice buffer 43, one or more of all the files, or all the voice files 43*a*, all the performance files 43*b* or all the master files 43*c* between PC 1 and the electronic musical instrument 2. The matching of the files between the PC 1 and the electronic musical instrument 2 also results in the matching of the parameters included in the files between the PC 1 and the electronic musical instrument 2.

According to the above-described embodiment, as apparent from the above description, the user is allowed to make selections as to whether or not to cause matches of some parameters, parameters included in a group formed as a parameter pack, or parameters included in a group formed as a file of a plurality of parameters. According to the embodiment, furthermore, the user is also allowed to select the direction in which matches are caused. For example, the user is allowed to cause matches of parameters relating to tone color by making these parameters of the PC 1 follow those of the electronic musical instrument 2, so that both the PC 1 and the electronic musical instrument 2 use the tone-color-related parameters set by the electronic musical instrument 2, while the user causes matches of other parameters by making the other parameters of the electronic musical instrument 2 follow those of the PC 1 which operates as a parameter setting apparatus, so that both the PC 1 and the electronic musical instrument 2 use the other parameters set by the PC 1. Therefore, the above-described embodiment enables the user to promptly achieve complicated parameter settings by the easy matching operation.

Furthermore, it will be understood that the present invention is not limited to the above-described embodiment, but various modifications may be made without departing from the spirit and scope of the invention.

The above-described embodiment is designed such that the PC 1 carries out the parameter management of the electronic musical instrument 2, however, the electronic musical instrument 2 may be a tone generating apparatus. In this case, the tone generating apparatus corresponds to the tone generator 28 shown in FIG. 1, the tone generating apparatus having the processing circuit 20 and the storage circuit 21 without the operators 23 and the display portion 25 and the like. In addition, a plurality of electronic musical instruments 2 and a plurality of tone generating apparatuses may be connected to the PC 1, so that the PC 1 concurrently manages parameters of the plurality of electronic musical instruments 2 and tone generating apparatuses. In this case, the PC 1 distinguishes the electronic musical instruments 2 and the tone generating apparatuses on a network to cause matches of parameters between the PC 1 and the respective electronic musical instruments 2 and tone generating apparatuses. In the present invention, matches are caused between parameters stored in the PC 1 and those stored in the electronic musical instrument 2, however, parameter types can vary between the PC 1 and the electronic musical instrument 2. In this case, matching of the parameter types may be carried out before matching of set values of parameters.

According to the circumstances where the user uses the PC 1 and the electronic musical instrument 2, matches of the set values of all the parameters are not necessarily desired. According to the circumstances, furthermore, initial settings on the direction in which matches are sought between the PC 1 and the electronic musical instrument 2 can vary. When it is necessary to limit the parameter types which the PC 1 is allowed to control, therefore, this embodiment may be modified such that matches of only the parameters which the PC 1 is allowed to control are sought. In addition, when users vary between the PC 1 and the electronic musical instrument 2, so that matches of parameters relating to operation of the PC 1 and the electronic musical instrument 2 are required, but matches of the files stored in the voice buffer 43 are not demanded, this embodiment may be modified such that matches of the files of the voice buffer 43 are not allowed, but matches of the current parameters of the current buffer 42 are sought. When the user desires to transfer settings of one electronic musical instrument 2 to the other electronic musical instrument 2, furthermore, the one electronic musical instrument 2 is connected to the PC 1 to make the parameters of the PC 1 follow the parameters which are stored in the one electronic musical instrument 2 and are demanded by the user. The user then replaces the one electronic musical instrument 2 with the other electronic musical instrument 2 to connect to the PC 1 to make the parameters of the other electronic musical instrument 2 follow the parameters stored in the PC 1 to cause matches between the parameters of the other electronic musical instrument 2 and those of the PC 1. As a result, the parameters of the one electronic musical instrument 2 are copied to the other electronic musical instrument 2.

In the parameter management apparatus (PC 1) for the electronic musical instrument 2 according to the present invention, furthermore, when the storage circuit 11 does not store the parameter management program, a hard disk device, a CD-ROM or the like may store the parameter management program and data to allow the PC 1 to load the parameter management program and the data into the storage circuit 11. Alternatively, the PC 1 may connect to a server computer via a communications network to download the parameter management program and data from the server computer and store the downloaded parameter management program and data in the storage circuit 11.

What is claimed is:

1. A parameter management apparatus (PMA) for an externally connected musical apparatus (XMA), the XMA comprising an XMA current buffer storing one or more values of one or more XMA current parameters and an XMA voice buffer storing one or more values of one or more XMA voice parameters, the PMA comprising:

- a PMA current buffer storing values of a plurality of PMA current parameters which are currently in use;
- a PMA voice buffer storing values of a plurality of PMA voice parameters;
- a parameter selection portion selecting, in a single selection of parameters, one or more PMA current parameters from the plurality of PMA current parameters and one or more PMA voice parameters from the plurality of PMA voice parameters; and
- a match controlling portion matching one or more values of the selected one or more PMA current parameters and one or more values of the corresponding one or more XMA current parameters in a current parameter match and matching one or more values of the selected one or more PMA voice parameters and one or more values of the corresponding one or more XMA voice parameters in a voice parameter match, the current parameter match and the voice parameter match each having a matching direction between the PMA and the XMA, the matching direction of the current parameter match being different from the matching direction of the voice parameter match for said single selection of parameters, the matching direction of the current parameter match comprising one of a first matching direction and a second matching direction, the matching direction of the voice parameter match comprising the other of the first matching direction and the second matching direction, wherein a PMA parameter follows an XMA parameter in the first matching direction, and wherein an XMA parameter follows a PMA parameter in the second matching direction.

2. The parameter management apparatus (PMA) according to claim 1, the PMA further comprising:

- a matching direction selection portion selecting, for each matching direction of the current parameter match and the voice parameter match, either the first matching direction or the second matching direction.

3. The parameter management apparatus (PMA) according to claim 1, the plurality of PMA current parameters including a plurality of groups of PMA current parameters, wherein

- the parameter selection portion selects the one or more PMA current parameters as one or more groups of PMA current parameters from among the plurality of groups of PMA current parameters.

4. The parameter management apparatus (PMA) according to claim 1, the plurality of PMA voice parameters including a plurality of groups of PMA voice files, wherein

- the parameter selection portion selects the one or more PMA voice parameters as one or more groups of PMA voice files from among the plurality of groups of PMA voice files.

5. The parameter management apparatus (PMA) according to claim 1, wherein the plurality of PMA current parameters and the plurality of PMA voice parameters are divided into a plurality of groups; and the parameter selection portion selects all the groups at a time or some of the groups individually from among the plurality of groups for the current parameter match and the voice parameter match.

6. The parameter management apparatus (PMA) according to claim 1, wherein the XMA voice buffer stores a plurality of XMA voice parameters grouped under a plurality of files; and some of the files from among the plurality of files includes the one or more XMA voice parameters for the voice parameter match.

7. The parameter management apparatus (PMA) according to claim 1, wherein the plurality of PMA current parameters are classified into a voice function, a performance function, or a master function according to function.

8. The parameter management apparatus (PMA) according to claim 1, wherein the plurality of PMA voice parameters are classified into a voice file, a performance file, or a master file according to function.

9. The parameter management apparatus (PMA) according to claim 1, wherein the XMA is an electronic musical instrument or a tone generating apparatus for generating musical tone signals.

10. A non-transitory recording medium storing one or more computer programs for a parameter management apparatus (PMA) for an externally connected musical apparatus (XMA), the XMA comprising an XMA current buffer storing one or more values of one or more XMA current parameters and an XMA voice buffer storing one or more values of one or more XMA voice parameters, the PMA comprising a PMA current buffer storing values of a plurality of PMA current parameters which are currently in use and a PMA voice buffer storing values of a plurality of PMA voice parameters, wherein the one or more computer programs, when executed by a processor, cause the PMA to perform a method comprising:

selecting, in a single selection of parameters, one or more PMA current parameters from the plurality of PMA current parameters and one or more PMA voice parameters from the plurality of PMA voice parameters;

matching one or more values of the selected one or more PMA current parameters and one or more values of the corresponding one or more XMA current parameters in a current parameter match and matching one or more values of the selected one or more PMA voice parameters and one or more values of the corresponding one or more XMA voice parameters in a voice parameter match, the current parameter match and the voice parameter match each having a matching direction between the PMA and the XMA, the matching direction of the current parameter match being different from the matching direction of the voice parameter match for said single selection of parameters, the matching direction of the current parameter match comprising one of a first matching direction and a second matching direction, the matching direction of the voice parameter match comprising the other of the first matching direction and the second matching direction, wherein a PMA parameter follows an XMA parameter in the first matching direction, and wherein an XMA parameter follows a PMA parameter in the second matching direction.

11. An externally connected musical apparatus (XMA) for a parameter management apparatus (PMA), the PMA comprising a PMA current buffer storing one or more values of one or more PMA current parameters and a PMA voice buffer storing one or more values of one or more PMA voice parameters, the one or more PMA current parameters and the one or more PMA voice parameters being selected in a single selection of parameters, the XMA comprising:

an XMA current buffer storing one or more values of one or more XMA current parameters to be matched with one or more values of the selected one or more PMA current parameters in a current parameter match, the one or more XMA current parameters currently in use;

an XMA voice buffer storing one or more values of one or more XMA voice parameters to be matched with one or more values of the selected one or more PMA voice parameters in a voice parameter match;

a parameter replacing portion replacing, in a first case, the one or more values of the one or more XMA current parameters with the one or more values of the selected one or more PMA current parameters or replacing, in a second case, the one or more values of the one or more XMA voice parameters with the one or more values of the selected one or more PMA voice parameters; and a parameter transmitting portion transmitting, in the first case, the one or more values of the one or more XMA voice parameters to the PMA for replacing the one or more values of the selected one or more PMA voice parameters or transmitting, in the second case, the one or more values of the one or more XMA current parameters to the PMA for replacing the one or more values of the selected one or more PMA current parameters, wherein the current parameter match and the voice parameter match each has a matching direction between the PMA and the XMA, the matching direction of the current parameter match being different from the matching direction of the voice parameter match for said single selection of parameters.

12. The externally connected musical apparatus (XMA) according to claim 11, the one or more XMA current parameters including one or more groups of XMA current parameters.

13. The externally connected musical apparatus (XMA) according to claim 11, the one or more XMA voice parameters including one or more groups of XMA voice files.

14. The parameter management apparatus (PMA) according to claim 11, wherein the plurality of PMA current parameters are classified into a voice function, a performance function, or a master function according to function.

15. The parameter management apparatus (PMA) according to claim 11, wherein the plurality of PMA voice parameters are classified into a voice file, a performance file, or a master file according to function.

16. The externally connected musical apparatus (XMA) according to claim 11, wherein the XMA is an electronic musical instrument or a tone generating apparatus for generating musical tone signals.

17. A non-transitory recording medium storing one or more computer programs for an externally connected musical apparatus (XMA) for a parameter management apparatus (PMA), the PMA comprising a PMA current buffer storing one or more values of one or more PMA current parameters and a PMA voice buffer storing one or more values of one or more PMA voice parameters, the one or more PMA current parameters and the one or more PMA voice parameters being selected in a single selection of parameters, the XMA comprising an XMA current buffer storing one or more values of one or more XMA current parameters to be matched with one or more values of the selected one or more PMA current parameters in a current parameter match, the one or more XMA current parameters currently in use, and an XMA voice buffer storing one or more values of one or more XMA voice parameters to be matched with one or more values of the selected one or more PMA voice parameters in a voice parameter match, wherein the one or more computer programs, when executed by a processor, cause the XMA to perform a method comprising:

replacing, in a first case, the one or more values of the one or more XMA current parameters with the one or more values of the selected one or more PMA current parameters or replacing, in a second case, the one or more values of the one or more XMA voice parameters with the one or more values of the selected one or more PMA voice parameters; and transmitting, in the first case, the one or more values of the one or more XMA voice parameters to the PMA for replacing the one or more values of the selected one or more PMA voice parameters or transmitting, in the second case, the one or more values of the one or more XMA current parameters to the PMA for replacing the one or more values of the selected one or more PMA current parameters, wherein the current parameter match and the voice parameter match each has a matching direction between the PMA and the XMA, the matching direction of the current parameter match being different from the matching direction of the voice parameter match for said single selection of parameters.

* * * * *